(12) United States Patent
Tanaka

(10) Patent No.: US 9,684,169 B2
(45) Date of Patent: Jun. 20, 2017

(54) IMAGE PROCESSING APPARATUS AND IMAGE PROCESSING METHOD FOR VIEWPOINT DETERMINATION

(71) Applicant: CANON KABUSHIKI KAISHA, Tokyo (JP)

(72) Inventor: Yasumi Tanaka, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 14/301,566

(22) Filed: Jun. 11, 2014

(65) Prior Publication Data

US 2014/0375687 A1    Dec. 25, 2014

(30) Foreign Application Priority Data

Jun. 24, 2013    (JP) .................................. 2013-132026

(51) Int. Cl.
  *G02B 27/01* (2006.01)
  *G06T 19/00* (2011.01)
  *G06F 3/01* (2006.01)
(52) U.S. Cl.
  CPC .......... *G02B 27/0172* (2013.01); *G06F 3/011* (2013.01); *G06T 19/006* (2013.01)
(58) Field of Classification Search
  CPC .... G02B 27/0172; G06T 19/00; G06T 19/006
  USPC ........................................................ 345/633
  See application file for complete search history.

(56) References Cited

U.S. PATENT DOCUMENTS

| | | | |
|---|---|---|---|
| 6,556,206 B1 * | 4/2003 | Benson et al. ................. | 345/473 |
| 6,972,734 B1 | 12/2005 | Ohshima et al. | |
| 7,292,240 B2 * | 11/2007 | Okuno et al. .................. | 345/419 |
| 7,782,320 B2 | 8/2010 | Kuroki | |
| 2003/0210832 A1 * | 11/2003 | Benton ................. | G06T 19/006 382/284 |
| 2004/0109009 A1 * | 6/2004 | Yonezawa ............. | G06T 19/006 345/632 |
| 2004/0223190 A1 * | 11/2004 | Oka .............................. | 358/302 |
| 2007/0252833 A1 | 11/2007 | Kuroki | |
| 2012/0050162 A1 * | 3/2012 | Kakuta et al. ................. | 345/158 |

(Continued)

FOREIGN PATENT DOCUMENTS

| | | |
|---|---|---|
| CN | 101673161 A | 3/2010 |
| CN | 102508546 A | 6/2012 |

(Continued)

OTHER PUBLICATIONS

Oct. 2, 2014 extended European Search Report in corresponding to foreign counterpart application European Patent Application No. 14171670.4.

(Continued)

*Primary Examiner* — Jeffery A Brier
(74) *Attorney, Agent, or Firm* — Fitzpatrick, Cella, Harper & Scinto

(57) ABSTRACT

While a first mode is set as the operation mode of an image processing apparatus, an image of a virtual space containing a virtual object seen from a first viewpoint having a position and orientation set by a user is generated and output. While a second mode is set as the operation mode of the image processing apparatus, an image of a virtual space seen from a second viewpoint determined based on information of the first viewpoint and the position of a head mounted display device is generated and output.

7 Claims, 9 Drawing Sheets

(56) References Cited

U.S. PATENT DOCUMENTS

| | | | |
|---|---|---|---|
| 2012/0050281 A1* | 3/2012 | Tanaka et al. | 345/419 |
| 2012/0050326 A1* | 3/2012 | Tanaka | 345/633 |
| 2012/0215354 A1* | 8/2012 | Krasny et al. | 700/255 |
| 2013/0120372 A1* | 5/2013 | Lee et al. | 345/419 |

FOREIGN PATENT DOCUMENTS

| | | |
|---|---|---|
| JP | 2004-355131 A | 12/2004 |
| JP | 2005-025563 A | 1/2005 |
| JP | 2006-079174 A | 3/2006 |
| JP | 2007-299062 A | 11/2007 |
| JP | 2009-301350 A | 12/2009 |

OTHER PUBLICATIONS

3DCG Software (Three-Dimensional Computer Graphics Software), "CG & Image Mechanism Encyclopedia", Dec. 31, 2003, pp. 98-101, Works Corporation ed.

Jan. 24, 2017 Chinese Official Action in Chinese Patent Application No. 201410280298.6.

\* cited by examiner

FIG. 5A APPLICATION MODE

FIG. 5C VR MODE

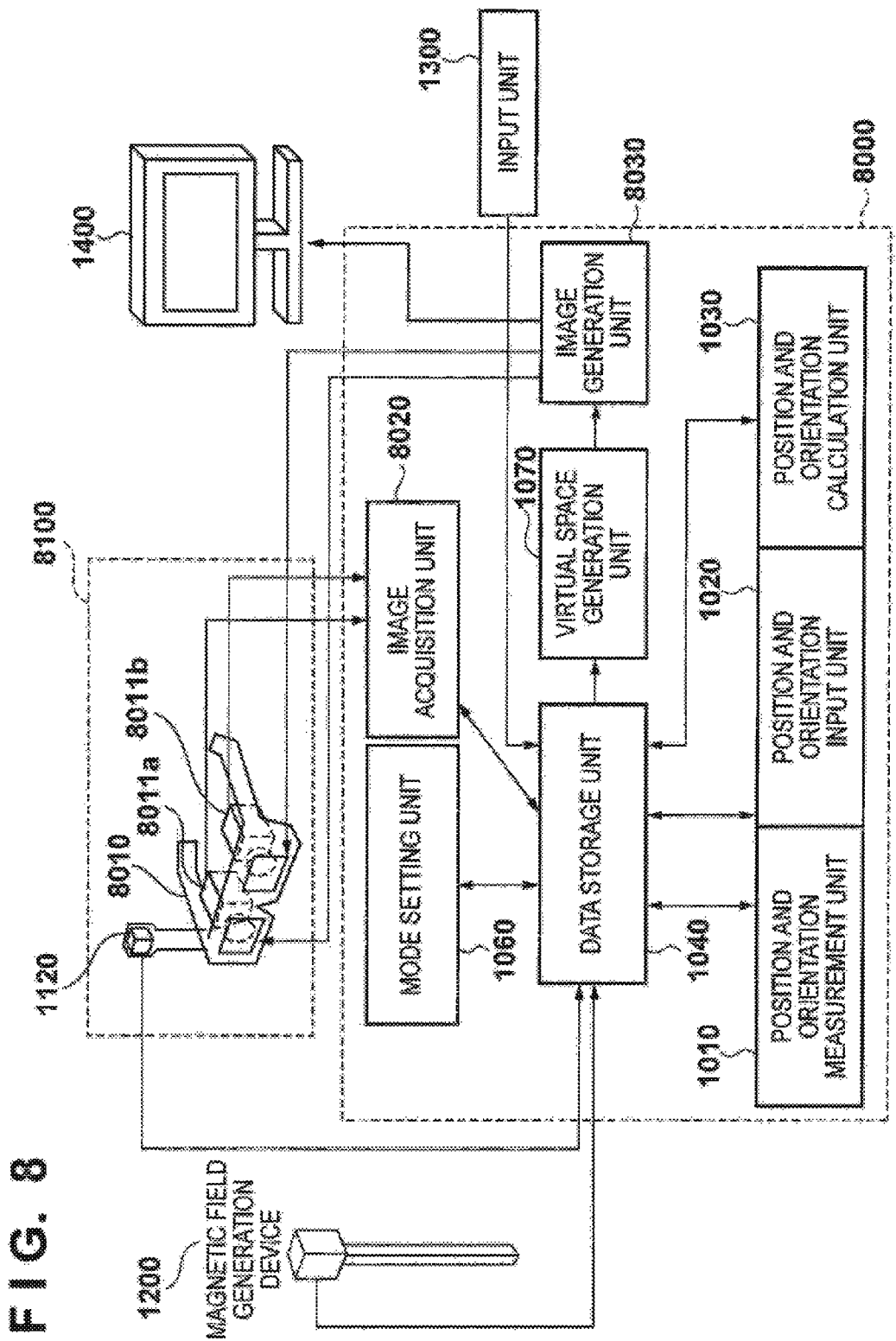

IMAGE PROCESSING APPARATUS AND IMAGE PROCESSING METHOD FOR VIEWPOINT DETERMINATION

BACKGROUND OF THE INVENTION

Field of the Invention

The present invention relates to a technique that provides a virtual space or mixed reality space.

Description of the Related Art

Recently, studies of MR (Mixed Reality) aiming at seamless combination of a physical space and virtual space have been made actively. An image display device which presents mixed reality is, for example, a device having the following arrangement. More specifically, this device displays an image obtained by superimposing and rendering, on an image in a physical space that is sensed by an image sensing device such as a video camera, an image in a virtual space (for example, a virtual object or character information rendered by computer graphics) that is generated in accordance with the position and orientation of the image sensing device. As such a device, for example, an HMD (Head Mounted Display) is usable.

The image display device can also be implemented by an optical see-through method that displays a virtual space image generated in accordance with the position and orientation of the viewpoint of an operator, on an optical see-through type display mounted on the head of the operator.

On the other hand, a virtual object is generally formed by using a commercially available CAD (Computer Aided Design) or 3DCG software (three-dimensional computer graphics software) (WORKS CORPORATION ed., "CG & Image Mechanism Encyclopedia", issued Dec. 31, 2003, pp. 98-101). In addition, a method of providing an experience of a virtual reality space or mixed reality space by using the 3DCG software is also disclosed (Japanese Patent Laid-Open No. 2007-299062). By combining these techniques, an operator can experience a combination of the virtual reality space and mixed reality space by using the CAD and 3DCG software.

Unfortunately, the conventional methods have the following problem. That is, when an operator checks, in a mixed reality space, a virtual object which he or she has checked by CG software, the position of the virtual object is uncertain because the viewpoint at which the operator has checked the object last by the CG software is entirely different from the viewpoint of the mixed reality space.

SUMMARY OF THE INVENTION

The present invention has been made in consideration of the above problem, and provides a technique which, when switching viewpoints for generating a virtual space image, minimizes a change in visual field before and after the switching.

According to the first aspect of the present invention, an image processing apparatus comprises: an acquisition unit configured to acquire a position and orientation of a head mounted display device; a first generation unit configured to generate and output an image of a virtual space containing a virtual object seen from a first viewpoint having a position and orientation set by a user, while a first mode is set as an operation mode of the image processing apparatus; and a second generation unit configured to generate and output an image of a virtual space seen from a second viewpoint determined based on information of the first viewpoint and the position acquired by the acquisition unit, while a second mode is set as the operation mode of the image processing apparatus.

According to the second aspect of the present invention, an image processing method to be performed by an image processing apparatus, wherein comprises: acquiring a position and orientation of a head mounted display device; generating and outputting an image of a virtual space containing a virtual object seen from a first viewpoint having a position and orientation set by a user, while a first mode is set as an operation mode of the image processing apparatus; and generating and outputting an image of a virtual space seen from a second viewpoint determined based on information of the first viewpoint and the position, while a second mode is set as the operation mode of the image processing apparatus.

Further features of the present invention will become apparent from the following description of exemplary embodiments with reference to the attached drawings.

BRIEF DESCRIPTION OF THE DRAWINGS

FIGS. 5A to 5C are views showing virtual space images;

FIG. 8 is a block diagram showing a functional configuration example of a system.

DESCRIPTION OF THE EMBODIMENTS

Embodiments of the present invention will be explained below with reference to the accompanying drawings. Note that each embodiment to be explained below indicates an example when the present invention is carried out in practice, and is one practical embodiment of the arrangement described in the scope of claims.

First Embodiment

Figure 1:
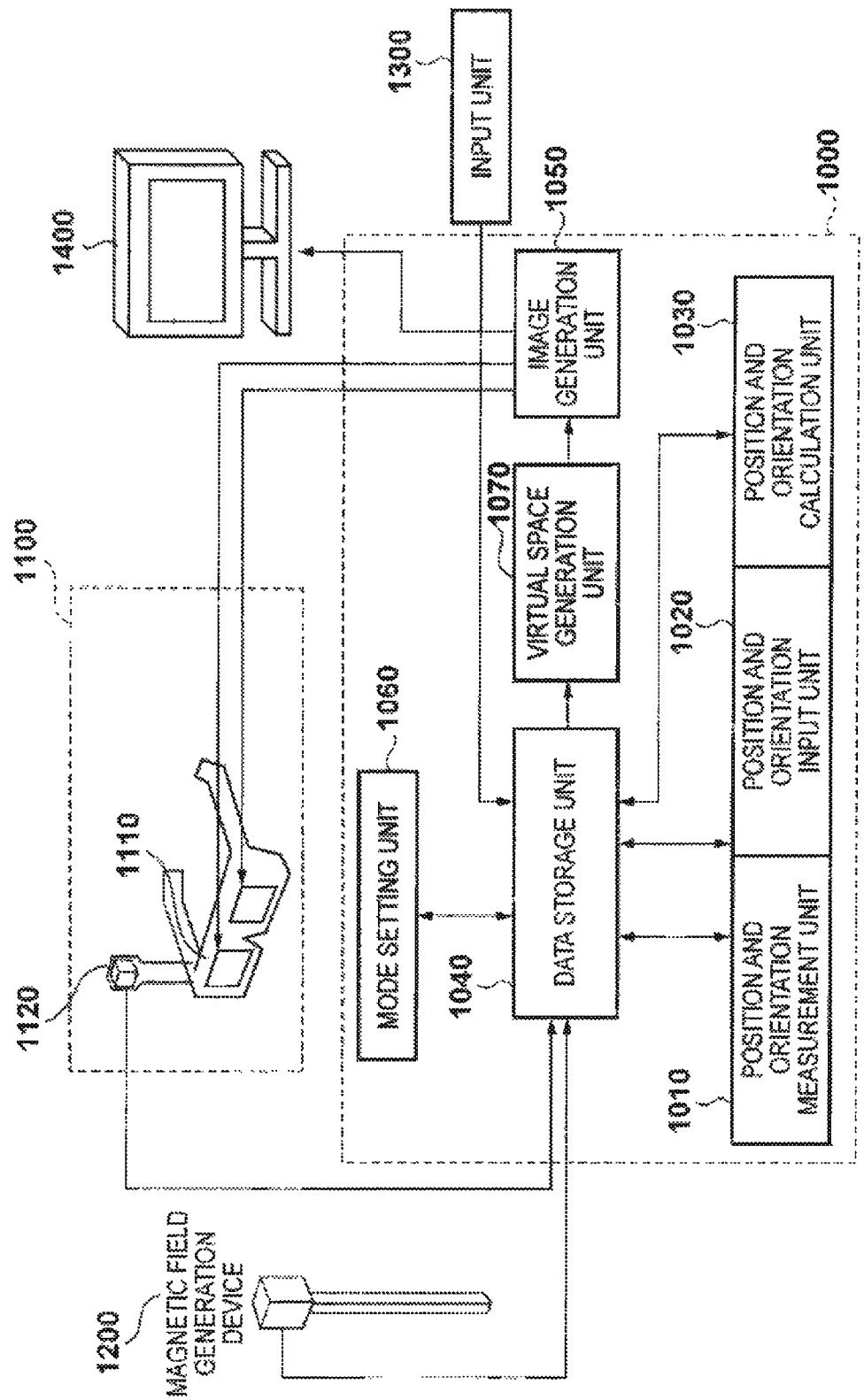
FIG. 1 is a block diagram showing a functional configuration example of a system.

First, a functional configuration example of a system according to this embodiment will be explained with reference to a block diagram shown in FIG. 1. As shown in FIG. 1, the system according to this embodiment includes a magnetic field generation device 1200, a head mounted display (to be referred to as the HMD hereinafter) 1100, an image processing apparatus 1000, an input unit 1300, and a display unit 1400.

The HMD 1100 will be explained first. The HMD 1100 includes a display device 1110 that provides an image in front of user's eyes when the HMD 1100 is mounted on the user's head, and a magnetic receiver 1120 for measuring its own position and orientation.

Display screens are attached to the display device 1110. The display screens are attached to the display device 1110 so as to be positioned before the right and left eyes of the user when he or she mounts the display device 1110 on his or her head. The display screens display an output image from the image processing apparatus 1000. Accordingly, the image generated by the image processing apparatus 1000 is provided before the user's eyes.

The magnetic field generation device 1200 is a device for generating a magnetic field around it. The magnetic receiver 1120 detects a change in magnetism corresponding to the position and orientation of the magnetic receiver 1120 in the magnetic field generated by the magnetic field generation device 1200, and outputs a signal indicating the detection result to the image processing apparatus 1000. The communication between the HMD 1100 and image processing apparatus 1000 can be either wired communication or wireless communication.

Next, the image processing apparatus 1000 will be explained. Upon receiving the signal from the magnetic receiver 1120, a position and orientation measurement unit 1010 obtains the position and orientation of the magnetic receiver 1120 in a world coordinate system based on the received signal. The world coordinate system is a coordinate system in which a predetermined position in a physical space is the origin, and three axes perpendicular to each other at the position of this origin are the x-axis, y-axis, and z-axis.

Then, the position and orientation measurement unit 1010 adds "a position and orientation relationship between the magnetic receiver 1120 and the left eye display screen of the display device 1110" to the position and orientation of the magnetic receiver 1120 in the world coordinate system, thereby obtaining the position and orientation of a left eye viewpoint in the world coordinate system. Subsequently, the position and orientation measurement unit 1010 stores the obtained position and orientation of the left eye viewpoint in the world coordinate system in a data storage unit 1040.

Also, the position and orientation measurement unit 1010 adds "a position and orientation relationship between the magnetic receiver 1120 and the right eye display screen of the display device 1110" to the position and orientation of the magnetic receiver 1120 in the world coordinate system, thereby obtaining the position and orientation of a right eye viewpoint in the world coordinate system. Then, the position and orientation measurement unit 1010 stores the obtained position and orientation of the right eye viewpoint in the world coordinate system in the data storage unit 1040.

"The position and orientation relationship between the magnetic receiver 1120 and the left eye display screen of the display device 1110" and "the position and orientation relationship between the magnetic receiver 1120 and the right eye display screen of the display device 1110" are premeasured known values. These known values are pre-stored in the data storage unit 1040.

In this embodiment as described above, the position and orientation of the viewpoint (the right eye display screen or left eye display screen) are measured by using the magnetic sensor. However, various methods are available as the method of measuring the position and orientation, and any method can be adopted. For example, it is possible to measure the position and orientation by using an infrared sensor, ultrasonic sensor, or optical sensor. It is also possible to obtain the position and orientation of an image sensing device attached to the display device 1110 (that is, the position and orientation of the display device 1110) from an image sensed by the image sensing device. Furthermore, mechanical measurements may also be performed.

Note that a process of generating an image to be displayed on the right eye display screen and a process of generating an image to be displayed on the left eye display screen are basically the same except for the positions and orientations of the viewpoints (the right eye display screen and left eye display screen). In the following description, therefore, the process of providing an image to one of the right and left eye display screens, that is, to one viewpoint (one display screen) will be explained, but an explanation of the process for the other viewpoint will be omitted because the process for one viewpoint and the process for the other viewpoint are the same.

The position and orientation input unit 1020 stores, in the data storage unit 1040, the position and orientation of the viewpoint input by the user by operating the input unit 1300. As will be described in detail later, the position and orientation of the viewpoint input by the user by operating the input unit 1300 and stored in the data storage unit 1040 by the position and orientation input unit 1020 are used to generate a virtual space image in an application mode, and are the position and orientation of a viewpoint for the application mode.

A mode setting unit 1060 sets the operation mode of the image processing apparatus 1000 to a mode (one of a VR mode and the application mode) input by the user by operating the input unit 1300, and stores information indicating the set mode in the data storage unit 1040. In other words, mode input by the user is an operation of selecting the position and orientation of a viewpoint as the position and orientation of the viewpoint to be used to generate a virtual space image.

When the application mode is set, the position and orientation of the viewpoint stored in the data storage unit 1040 by the position and orientation input unit 1020, that is, the position and orientation of the viewpoint designated by the user are used as the position and orientation of the viewpoint to be used to generate a virtual space image.

When the VR mode is set, a new position and orientation are obtained from the position and orientation of the viewpoint stored in the data storage unit 1040 by the position and orientation input unit 1020, and the position and orientation of the viewpoint stored in the data storage unit 1040 by the position and orientation measurement unit 1010. The new position and new orientation thus obtained are used as the position and orientation of the viewpoint to be used to generate a virtual space image.

A position and orientation calculation unit 1030 operates when the VR mode is set, and performs a process of calculating the position and orientation of a viewpoint to be used to generate a virtual space image in the VR mode (that is, the position and orientation of a viewpoint for the VR mode). Details of the operation of the position and orientation calculation unit 1030 will be explained in detail later. Then, the position and orientation calculation unit 1030 stores the calculated position and orientation of the viewpoint in the data storage unit 1040.

A virtual space generation unit 1070 constructs a virtual space by using virtual space data stored in the data storage unit 1040. The virtual space data contains data pertaining to objects constructing the virtual space, and data pertaining to a light source for illuminating the virtual space.

An image generation unit 1050 selects the position and orientation of the viewpoint for the VR mode from the data storage unit 1040 when the VR mode is set, and selects the position and orientation of the viewpoint for the application mode from the data storage unit 1040 when the application mode is set. By using the position and orientation of the viewpoint selected from the data storage unit 1040, the image generation unit 1050 generates an image, which is viewed from the viewpoint, of the virtual space constructed by the virtual space generation unit 1070. Note that a process of generating a virtual space image viewed from a viewpoint having a predetermined position and orientation is a well-known technique, so a detailed explanation thereof will be omitted. Then, the image generation unit 1050 transmits the generated virtual space image to the display device 1110 (display screen). Note that the image generation unit 1050 may also transmit the generated virtual space image to the display unit 1400, in addition to the display device 1110. It is also possible to, for example, transmit the generated virtual space image to the display device 1110 or display unit 1400 in accordance with which of the VR mode and application mode is selected. Furthermore, the output destination of the virtual space image is not limited to the above-described objects, and may also be, for example, a display terminal such as a tablet or smartphone.

As described above, the data storage unit 1040 is a memory to be used to store calculated data and acquired data such that the data is readable, and store predefined data as known information. The data storage unit 1040 is formed by a RAM or hard disk drive.

The input unit 1300 includes, for example, a mouse, keyboard, and touch panel screen. The user can input various instructions, data, and the like as described previously by operating the input unit 1300. Note that the input unit 1300 can be any device as long as various instructions and data can be input as described above. For example, the input unit 1300 can be a device that recognizes a user's gesture. In this case, an instruction or data corresponding to the recognized gesture is input. It is, of course, also possible to form the input unit 1300 by combining two or more devices.

Figure 3:
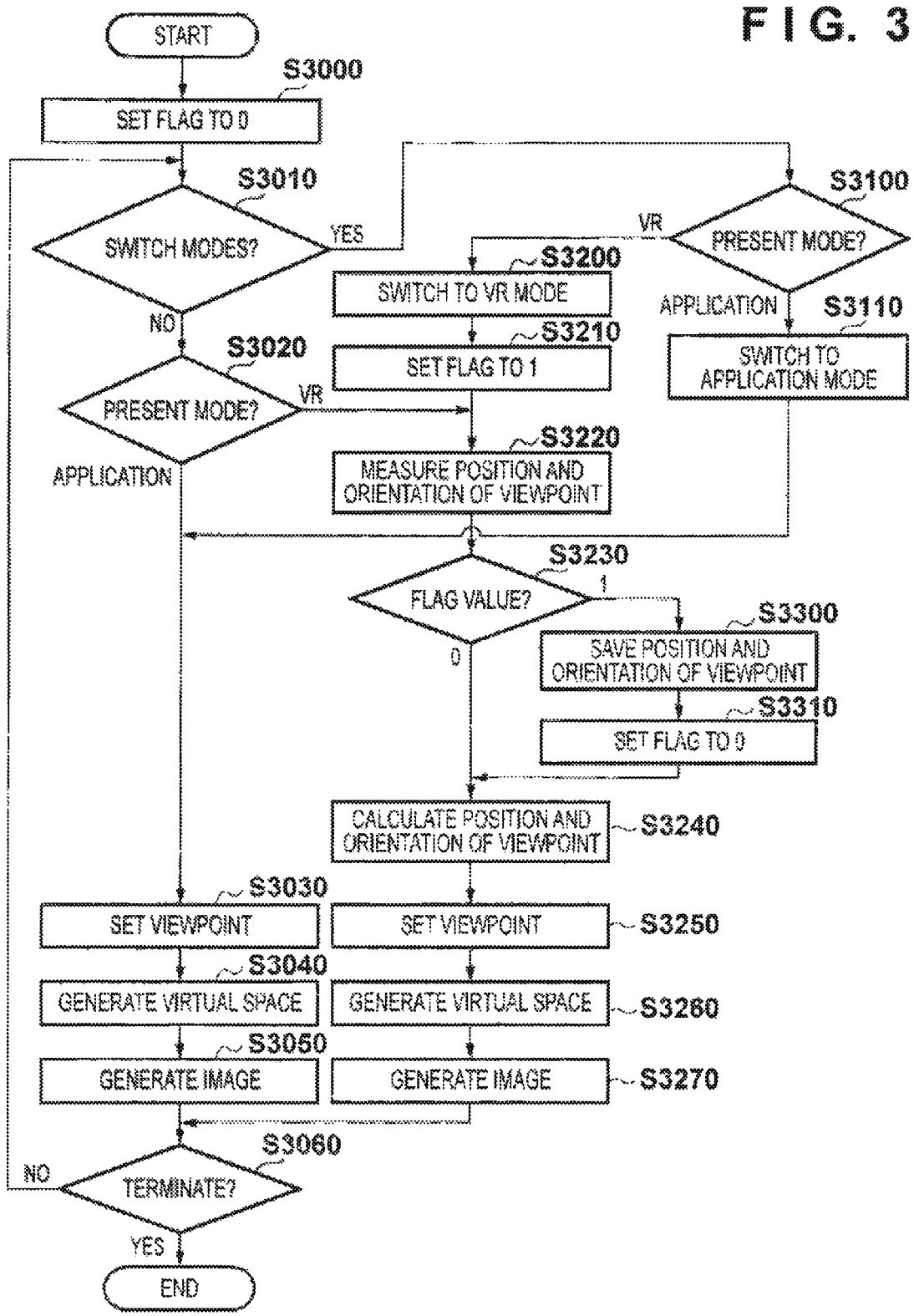
FIG. 3 is a flowchart of processing to be performed by an image processing apparatus 1000.

Next, a process to be performed by the image processing apparatus 1000 in order to generate and output a virtual space image will be explained with reference to FIG. 3 showing a flowchart of the process. First, in step S3000, the mode setting unit 1060 initializes the value of a flag to be used in the following process to 0. Assume that this flag value is managed in the data storage unit 1040.

Then, in step S3010, the mode setting unit 1060 determines whether an instruction for setting a mode is received from the input unit 1300. If it is determined that the instruction for setting a mode is received, the process advances to step S3100. If no instruction for setting a mode is received, the process advances to step S3020.

In step S3020, the mode setting unit 1060 determines whether the present operation mode of the image processing apparatus 1000 is the VR mode or application mode. If it is determined that the operation mode is the VR mode, the process advances to step S3220. If it is determined that the operation mode is the application mode, the process advances to step S3030.

In step S3030, the image generation unit 1050 reads out, from the data storage unit 1040, the position and orientation of the viewpoint for the application mode stored in the data storage unit 1040 by the position and orientation input unit 1020.

In step S3040, the virtual space generation unit 1070 reads out the virtual space data stored in the data storage unit 1040, and constructs a virtual space by using the readout data.

In step S3050, the image generation unit 1050 generates an image obtained when the virtual space constructed in step S3040 is viewed from the viewpoint having the position and orientation read out from the data storage unit 1040 in step S3030. Then, the image generation unit 1050 transmits the generated virtual space image to the display device 1110 or display unit 1400.

On the other hand, in step S3100, the mode setting unit 1060 stores information indicating the mode designated from the input unit 1300 in the data storage unit 1040, and determines whether the mode is the VR mode or application mode. If it is determined that the mode is the VR mode, the process advances to step S3200. If it is determined that the mode is the application mode, the process advances to step S3110. In step S3110, the mode setting unit 1060 sets the operation mode of the image processing apparatus 1000 to the application mode. Then, processing from step S3030 is performed.

On the other hand, in step S3200, the mode setting unit 1060 sets the operation mode of the image processing apparatus 1000 to the VR mode. In step S3210, the mode setting unit 1060 sets the flag value to 1.

In step S3220, the position and orientation measurement unit 1010 performs the above-mentioned process based on a signal received from the magnetic receiver 1120 in this stage, thereby obtaining the position and orientation of the viewpoint. In step S3230, the mode setting unit 1060 determines whether the flag value is 1 or 0. If it is determined that the flag value is 1, the process advances to step S3300. If it is determined that the flag value is 0, the process advances to step S3240.

In step S3300, the position and orientation measurement unit 1010 stores, in the data storage unit 1040, the position and orientation of the viewpoint obtained in step S3220 as a reference position and orientation so as to use them as the reference position and orientation in the following process. Then, in step S3310, the mode setting unit 1060 sets the flag value to 0.

In step S3240, the position and orientation calculation unit 1030 obtains the position and orientation of the viewpoint for the VR mode by executing a process to be explained below. The process of obtaining the position and orientation of the viewpoint for the VR mode in step S3240 will be explained by taking a practical example.

Figure 4A:
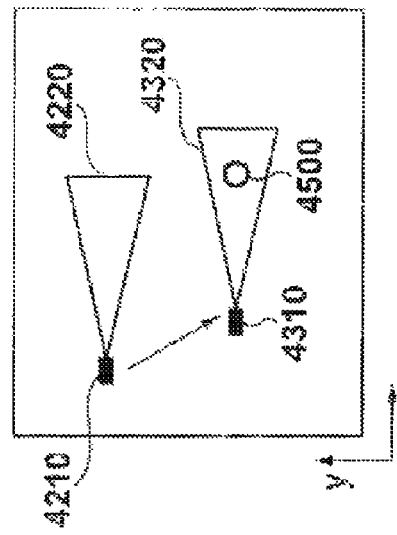
FIGS. 4A to 4D are views showing virtual spaces.
Figure 4C:
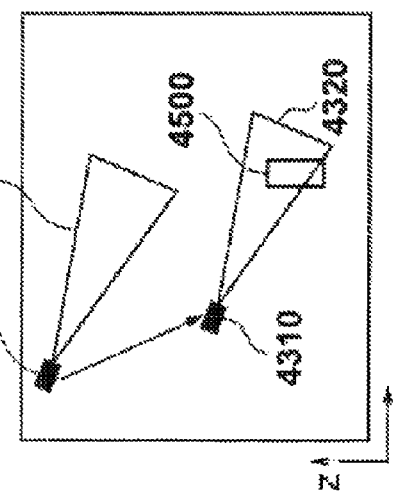

FIGS. 4A and 4C are views each showing a virtual space obtained by observing an X-Y plane in the world coordinate system by overlooking the plane along the Z-axis from the direction perpendicular to the plane (the direction perpendicular to the drawing surface is the Z-axis direction). Also, FIGS. 4B and 4D are views each showing a virtual space obtained by observing an X-Z plane in the world coordinate system by overlooking the plane along the Y-axis from the direction perpendicular to the plane (the direction perpendicular to the drawing surface is the Y-axis direction).

Figure 4B:
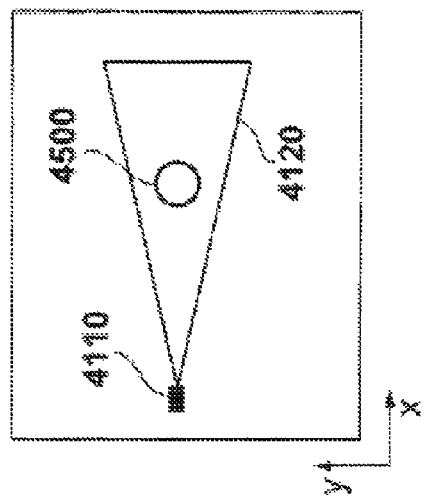
Figure 4D:
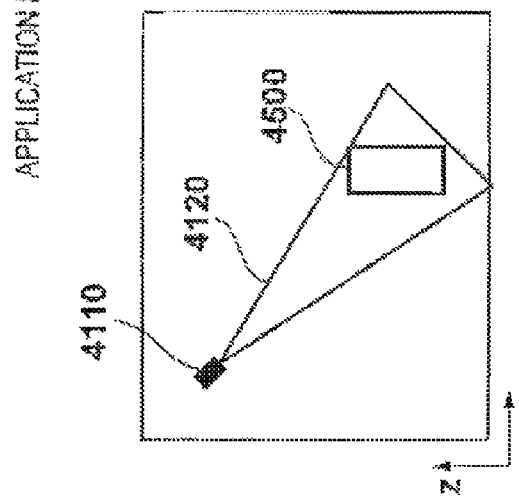

In the application mode as shown in FIGS. 4A and 4B, a viewpoint 4110 for which the position and orientation in the virtual space are designated by the input unit 1300 is set, and an image of an inner space (including a virtual object 4500) of a viewing frustum 4120 corresponding to the viewpoint 4110 is generated as a virtual space image. The viewpoint 4110 is a so-called "application mode viewpoint".

Assume that the operation mode of the image processing apparatus 1000 is switched to the VR mode in a state in which the position and orientation of the viewpoint in the application mode are as shown in FIGS. 4A and 4B. Assume also that when the operation mode is switched to the VR mode, the viewpoint for generating a virtual space image 4120 is switched to the viewpoint 4210 having the position and orientation obtained by the position and orientation measurement unit 1010. A viewpoint 4210 in FIGS. 4C and 4D is a viewpoint whose position and orientation are measured by the position and orientation measurement unit 1010. In this state, the view field (4120) of the application mode viewpoint 4110 contains the virtual object 4500, but the view field (4220) of the viewpoint 4210 does not contain the virtual object 4500.

The situation described in the previous paragraph is unsatisfactory. Accordingly, in the embodiment, the position and orientation calculation unit 1030 determines a VR mode viewpoint 4310 (a viewpoint having a view field (4320) containing the virtual object 4500) at some time after the mode has been changed from the application mode to the VR mode from the application mode viewpoint 4110, the current viewpoint 4210 that would correspond to a position measured by the position and orientation measurement unit 1010, and a reference viewpoint which is a viewpoint that was determined immediately after the operation mode was switched to the VR mode.

Assume that the position of the latest application mode viewpoint 4110 (immediately before the operation mode is switched to the VR mode) stored in the data storage unit 1040 is (x0, y0, z0). This is what the user sees at the time of switching modes. Assume also that the reference viewpoint position (the position component of the reference position and orientation) stored in the data storage unit 1040 in step S3300 is (xb, yb, zb) is a position in virtual space that corresponds to the VR viewpoint 4220 that would have been shown immediately after the mode was changed if the display was based on the measured position of the HMD 1110. Furthermore, assume that the position of the present viewpoint 4210 obtained in step S3220 that would be shown at the current time if the display was based on the measured position of the HMD 1110 is (x1, y1, z1).

In this state, the position (xv, yv, zv) of the VR mode viewpoint 4310 is obtained by (xv, yv, zv)=(x0+(x1−xb), y0+(y1−yb), z0+(z1−zb)). In other words current view=view in application mode+change in view caused by change in detected position of the HMD)

In step S3240, the position and orientation calculation unit 1030 obtains the position of the VR mode viewpoint by performing a calculation like this. As the orientation of the VR mode viewpoint, it is possible to adopt the orientation (yaw, roll, and pitch angles) of the viewpoint obtained in step S3220, or adopt a new orientation obtained based on this orientation. The position and orientation calculation unit 1030 stores the position and orientation of the VR mode viewpoint obtained as described above in the data storage unit 1040.

In step S3250, the image generation unit 1050 reads out, from the data storage unit 1040, the position and orientation of the VR mode viewpoint stored in the data storage unit 1040 in step S3240.

Then, in step S3260, the virtual space generation unit 1070 reads out the virtual space data stored in the data storage unit 1040, and constructs a virtual space by using the readout data.

Subsequently, in step S3270, the image generation unit 1050 generates an image obtained when the virtual space constructed in step S3260 is viewed from the viewpoint having the position and orientation read out from the data storage unit 1040 in step S3250. The image generation unit 1050 then transmits the generated virtual space image to the display device 1110 or display unit 1400.

FIG. 5A shows an example of the virtual space image generated based on the viewpoint 4110 in the state shown in FIGS. 4A and 4B. Since the view field of the viewpoint 4110 contains the virtual object 4500, the virtual space image based on the viewpoint 4110 contains the virtual object 4500 as shown in FIG. 5A.

Figure 5B:
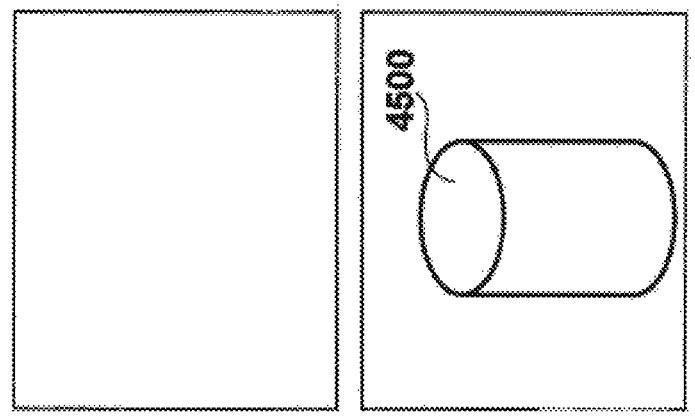

If a virtual space image (FIG. 5B) based on the viewpoint 4210 having the position and orientation obtained by the position and orientation measurement unit 1010 is generated after the operation mode is switched to the VR mode, the view field of the viewpoint 4210 does not contain the virtual object 4500, so the generated image does not contain the virtual object 4500. In this embodiment, however, a viewpoint for which the positional relationship with the application mode viewpoint is equal to the positional relationship between the reference position and the position obtained by the position and orientation measurement unit 1010 is used as the VR mode viewpoint, so the image contains the virtual object 4500 as shown in FIG. 5C.

Returning to FIG. 3, if the image processing apparatus 1000 (a controller (not shown)) detects that the termination condition of the process is met, for example, detects that the user has input an instruction for terminating the process by using the input unit 1300, the process is terminated after step S3060. On the other hand, if the process termination condition is not met, the process returns from step S3060 to step S3010, and repeats processing from step S3010.

As described above, the image processing apparatus according to this embodiment has the arrangement that acquires the position and orientation of a viewpoint set by a user in an application (first acquisition), and acquires the position and orientation of the head mounted display (second acquisition).

While a first mode is set as the operation mode of the image processing apparatus, an image of a virtual space viewed from a viewpoint having the position and orientation acquired in the first acquisition is generated and output (first generation).

If it is detected that the operation mode of the image processing apparatus is switched to a second mode different from the first mode, the position acquired by the second acquisition at the time of the detection is recorded as a reference position in the memory. While the second mode is set, an image of a virtual space viewed from a viewpoint having, as a viewpoint position in virtual space, a position at which the positional relationship with the position acquired by the first acquisition is equal to the positional relationship in real space between the reference position and the position acquired by the second acquisition at a later time is generated and output (second generation).

Second Embodiment

In this embodiment, the position and orientation of a VR mode viewpoint are obtained from the position and orientation of an application mode viewpoint, the position and orientation of a viewpoint obtained by a position and orientation measurement unit 1010 immediately after the operation mode is switched to the VR mode, and the position and orientation of a viewpoint obtained by the position and orientation measurement unit 1010 after the operation mode is switched to the VR mode. In the following description, only differences from the first embodiment will be explained, and items not particularly mentioned are the same as those of the first embodiment.

Figure 6:
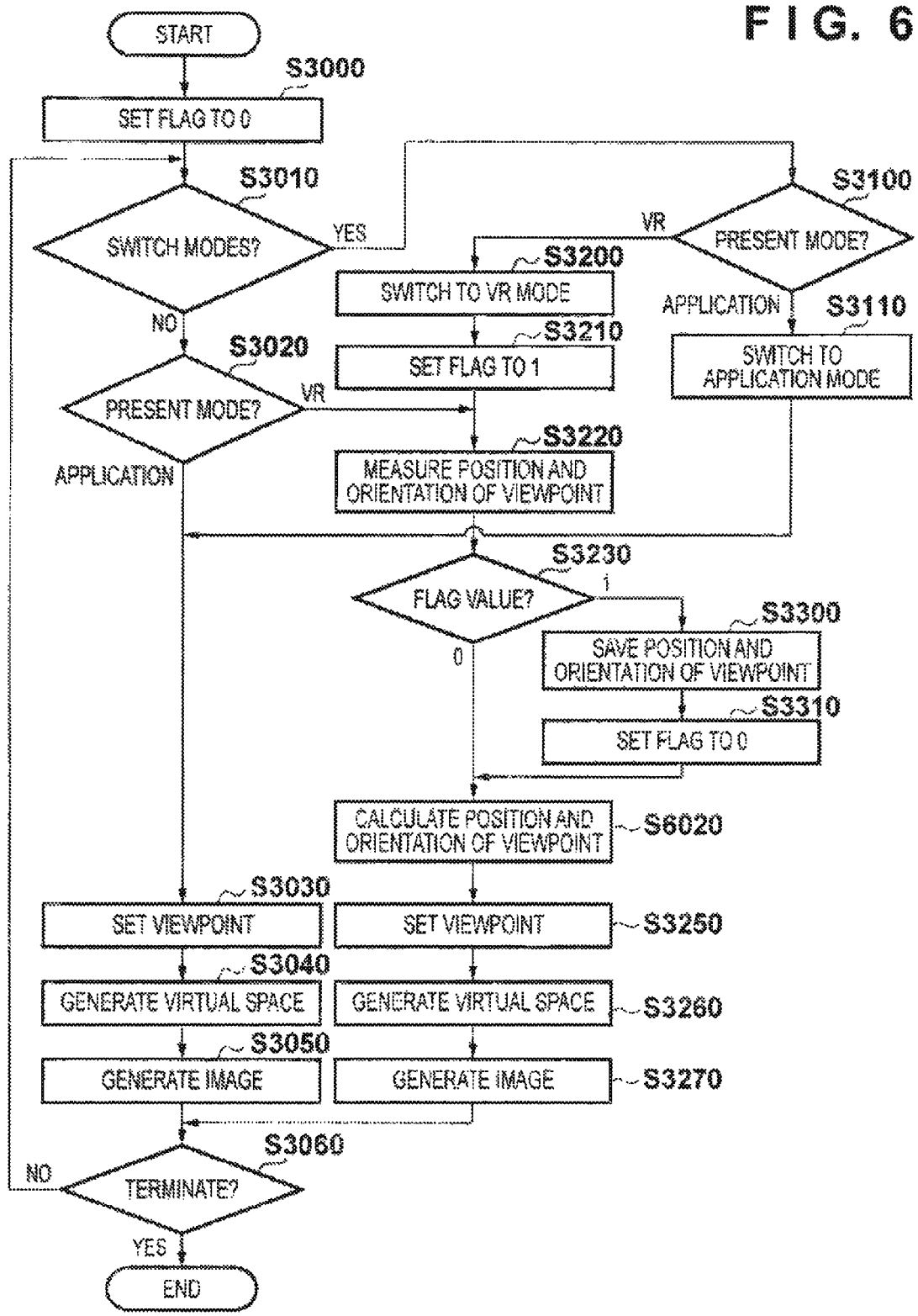
FIG. 6 is a flowchart of processing to be performed by the image processing apparatus 1000.

A process to be performed by an image processing apparatus 1000 according to this embodiment in order to generate and output a virtual space image will be explained with reference to FIG. 6 showing a flowchart of the process. In FIG. 6, the same step numbers as in FIG. 3 denote processing steps that perform the same processes, and an explanation of the processes in these steps will be omitted.

In step S6020, a position and orientation calculation unit 1030 obtains the position and orientation of the VR mode viewpoint by executing a process to be explained below. This process in step S6020 will be explained with reference to FIGS. 7A to 7D. In FIGS. 7A to 7D, the same reference numerals as in FIGS. 4A to 4D denote the same portions, and an explanation thereof will be omitted.

Figure 7C:
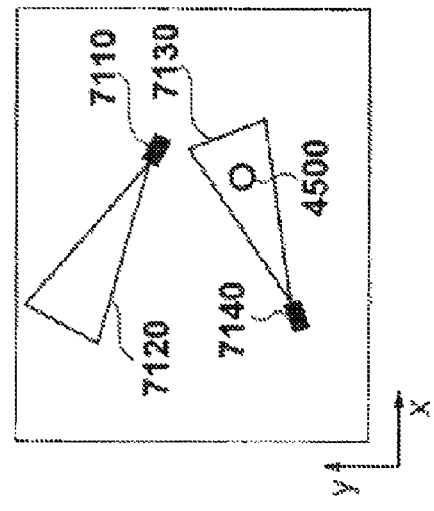
FIGS. 7A to 7D are views showing virtual spaces.
Figure 7D:
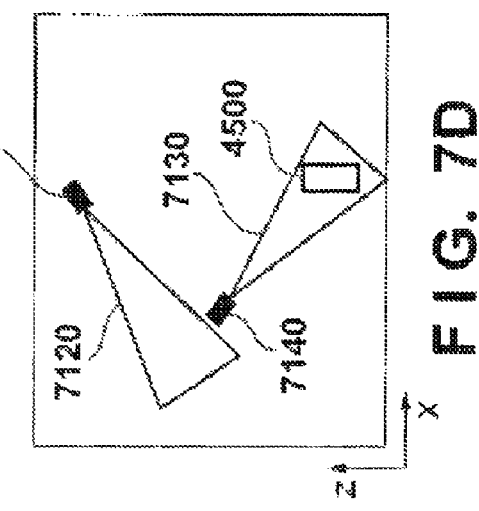
Figure 7A:
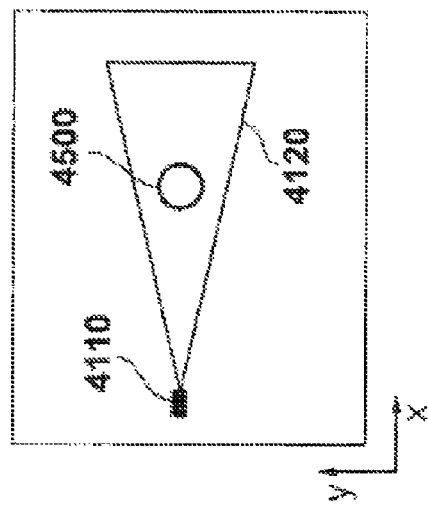
Figure 7B:
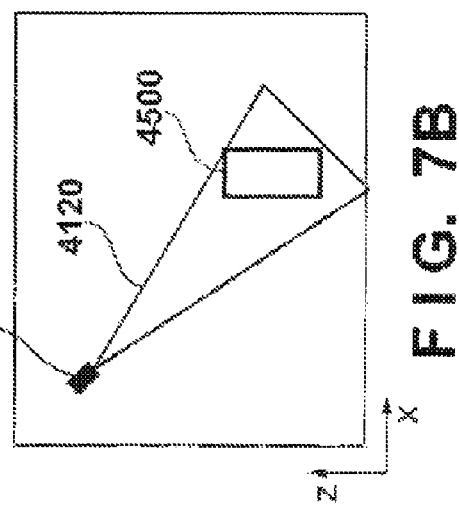

FIGS. 7A and 7C are views each showing a virtual space obtained by observing an X-Y plane in the world coordinate system by overlooking the plane along the Z-axis from the direction perpendicular to the plane (the direction perpendicular to the drawing surface is the Z-axis direction). Also, FIGS. 7B and 7D are views each showing a virtual space obtained by observing an X-Z plane in the world coordinate system by overlooking the plane along the Y-axis from the direction perpendicular to the plane (the direction perpendicular to the drawing surface is the Y-axis direction).

A viewpoint 7110 is a viewpoint for which the position and orientation are obtained by the position and orientation measurement unit 1010. Reference numeral 7120 denotes a viewing frustum indicating the view field of the viewpoint 7110. In this embodiment, a VR mode viewpoint 7140 is determined from an application mode viewpoint 4110, the viewpoint 7110 measured by the position and orientation measurement unit 1010, and a viewpoint immediately after the operation mode is switched to the VR mode. Reference numeral 7130 denotes a viewing frustum indicating the view field of viewpoint 7140.

Assume that the position of the latest application mode viewpoint 4110 (immediately before the operation mode is switched to the VR mode) stored in a data storage unit 1040 is (x0, y0, z0), and the orientation (yaw, roll, and pitch angles) is (Y0, R0, P0). This is what the user sees at the time of switching modes. Assume also that the reference viewpoint position (the position component of the reference position and orientation) stored in the data storage unit 1040 in step S3300 is (xb, yb, zb), and the viewpoint orientation (the orientation component of the reference position and orientation) is (Yb, Rb, Pb). This is the position and orientation in virtual space that corresponds to the VR viewpoint 7120 Furthermore, assume that the position of the present viewpoint 7110 obtained in step S3220 is (x1, y1, z1), and the orientation is (Y1, R1, P1), which is the position and orientation that would be shown if the display was based on the measured position of the HMD 1110.

Under the conditions, the position (xv, yv, zv) of the VR mode viewpoint 7140 is obtained by (xv, yv, zv)=(x0+(x1−xb), y0+(y1−yb), z0+(z1−zb)). Also, the orientation (Yv, Rv, Pv) of the VR mode viewpoint 7140 is obtained by (Yv, Rv, Pv)=(Y1, R0+(R1−Rb), P1).

The position and orientation calculation unit 1030 stores the position and orientation of the VR mode viewpoint obtained as described above in the data storage unit 1040. Then, processing from step S3250 is performed.

Note that a method of calculating a corrected orientation (the orientation of the VR mode viewpoint) by correcting the orientation obtained in step S3220 by using the orientation stored in the data storage unit 1040 in step S3300 and the orientation of the application mode viewpoint is not limited to the above-mentioned method.

Third Embodiment

The above embodiments have been explained by assuming that the display device 1110 is a virtual reality display device 1110 that has a display screen for displaying a virtual space image. However, the display device 1110 may be a mixed-reality display device 1110. The display device 1110 may be an optical see-through type display device. In this case, a user having the display device 1110 mounted on his or her head can observe a state in which a virtual space image is superimposed on a physical space seen through the display screen.

Also, the display device 1110 may be a so-called video see-through type display device that includes an image sensing device, and displays a composite image (an image of a mixed reality space) obtained by compositing a physical space image sensed by the image sensing device and a virtual space image.

In this embodiment, an arrangement using a video see-through type display device instead of the display device 1110 shown in FIG. 1 will be explained. A functional configuration example of a system according to this embodiment will be explained with reference to a block diagram shown in FIG. 8. In FIG. 8, the same reference numerals as in FIG. 1 denote the same functional units, and an explanation thereof will be omitted. In the following description, a mode in which a virtual space image is generated by using a measurement result from a magnetic receiver 1120 will be referred to as an MR mode.

A head mounted display 8100 includes the magnetic receiver 1120 and a video see-through type display device 8010.

The display device 8010 includes an image sensing device 8011a for sensing a physical space moving image from the position of the right eye of a user having the display device 8010 mounted on his or her head, and an image sensing device 8011b for sensing a physical space moving image from the position of the left eye. These image sensing devices sequentially transmit the sensed physical space images of individual frames to an image processing apparatus 8000. The display device 8010 further includes a display screen for presenting an image in front of the user's right eye, and a display screen for presenting an image in front of the user's left eye, like the display device 1110.

An image acquisition unit 8020 of the image processing apparatus 8000 acquires the physical space images (right eye physical space image and left eye physical space image) transmitted from the image sensing devices, and stores the acquired physical space images in a data storage unit 1040.

In this embodiment, it should be noted that the position and orientation of a viewpoint obtained by a position and orientation measurement unit 1010 are the position and orientation of each of the image sensing devices 8011a and 8011b. Various methods are applicable as a method of obtaining the positions and orientations of the image sensing devices 8011a and 8011b based on a signal from the magnetic receiver 1120, or by using another method.

Note also that the process of generating an image to be displayed on the right eye display screen and the process of generating an image to be displayed on the left eye display screen are basically the same except for the positions and orientations of the viewpoints (image sensing devices 8011a and 8011b). In the following description, therefore, the process of providing an image to one of the right and left eye display screens, that is, to one viewpoint (one display screen) will be explained, but an explanation of the process for the other viewpoint will be omitted because the process for one viewpoint and the process for the other viewpoint are the same.

An image generation unit 8030 generates a virtual space image in the same manner as in the image generation unit 1050. When the MR mode is set as the operation mode of the image processing apparatus 8000, the image generation unit 8030 generates a composite image by compositing the right eye physical space image and right eye virtual space image, and a composite image by compositing the left eye physical space image and left eye virtual space image. The virtual space images corresponding to the right and left eyes can be generated by using the positions and orientations of the image sensing devices (image sensing devices 8011a and 8011b) corresponding to the right and left eyes. The composite image can be generated on a memory such as the data storage unit 1040 by rendering a physical space image on the memory, and superimposing a virtual space image on the physical space image.

Then, the image generation unit 8030 transmits the right eye composite image (the composite image of the right eye physical space image and right eye virtual space image) to the right eye display screen. Also, the image generation unit 8030 transmits the left eye composite image (the composite image of the left eye physical space image and left eye virtual space image) to the left eye display screen.

On the other hand, in the application mode, the image generation unit 8030 does not generate any composite image, and transmits the generated virtual space image to a display unit 1400. In this step, a virtual space generation unit 1070 may also generate physical space data from information such as the depth.

Figure 9:
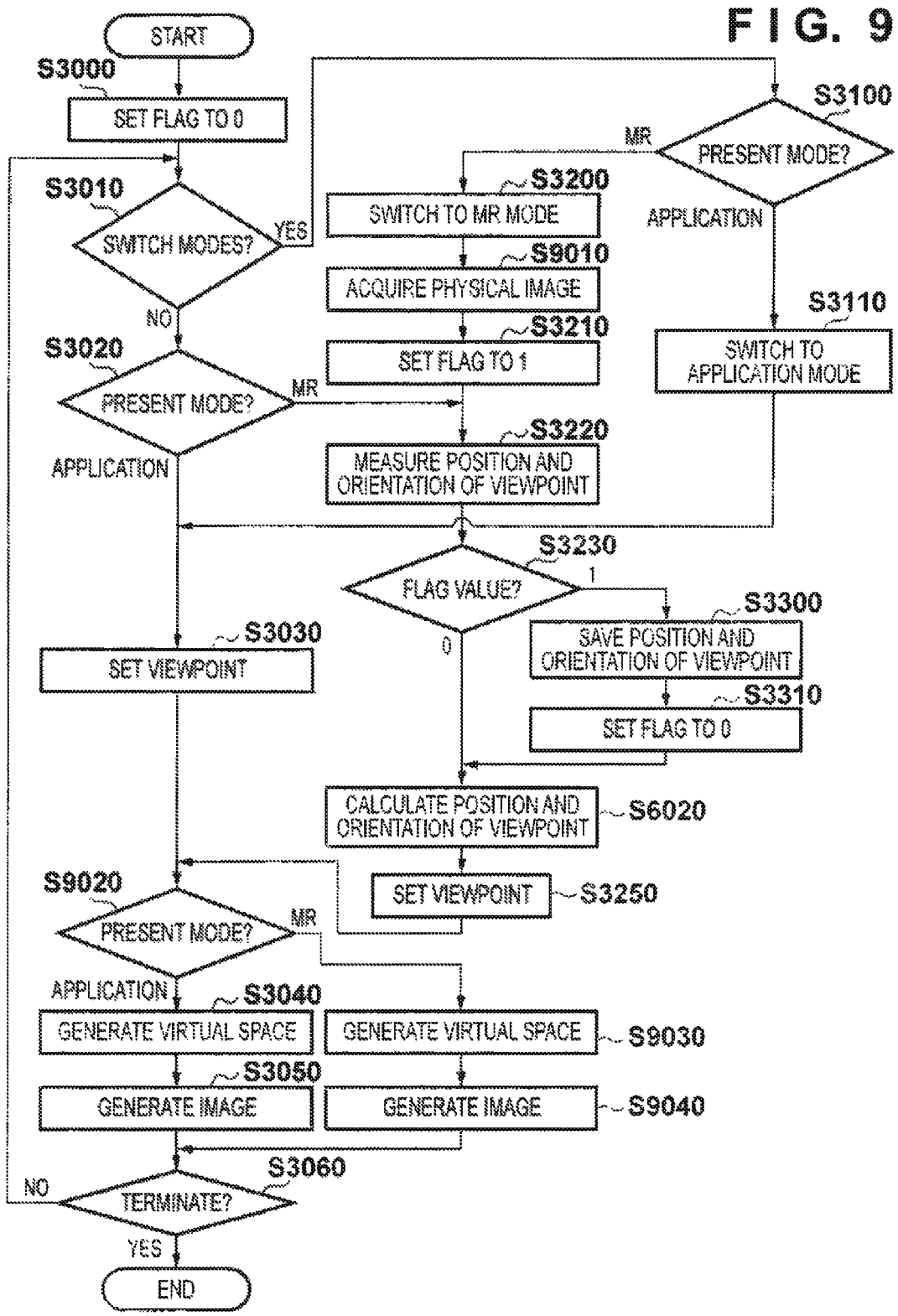
FIG. 9 is a flowchart of processing to be performed by an image processing apparatus 8000.

A process to be performed by the image processing apparatus 8000 according to this embodiment will be explained with reference to FIG. 9 showing a flowchart of the process. In FIG. 9, the same step numbers as in FIGS. 3 and 6 denote processing steps that perform the same processes, and an explanation of the processes in these steps will be omitted.

In step S3200, a mode setting unit 1060 sets the MR mode. In step S9010, the image acquisition unit 8020 acquires a physical space image, and stores the acquired physical space image in the data storage unit 1040.

In step S9020, the mode setting unit 1060 determines whether the operation mode of the image processing apparatus 8000 is the MR mode or application mode by referring to information stored in the data storage unit 1040 and indicating the operation mode of the image processing apparatus 8000. If it is determined that the operation mode is the MR mode, the process advances to step S9030. If it is determined that the operation mode is the application mode, the process advances to step S3040.

In step S9030, the virtual space generation unit 1070 constructs a virtual space in the same manner as in the first embodiment. In this step, it is also possible to generate a virtual space containing physical space model data acquired from, for example, image processing and a sensor in the virtual space.

In step S9040, the image generation unit 8030 generates an image of the virtual space (constructed in step S9030) in the same manner as in the first embodiment, based on the position and orientation of the MR mode viewpoint set in step S3250. Then, the image generation unit 8030 generates a composite image (corresponding to one eye) of the generated virtual space image and the physical space image acquired in step S9010, and transmits the generated composite image to a corresponding display screen of the display device 8010.

Fourth Embodiment

The above embodiments have been explained by taking the application mode and VR (MR) mode as examples of the operation mode of the image processing apparatus 1000. However, processes in these operation modes may also be performed in parallel.

Fifth Embodiment

The method of calculating the position and orientation of the viewpoint for the VR (MR) mode explained in the above embodiments is merely an example, and it is also possible to set and calculate a position and orientation so as to maintain relative positions or orientations of a viewpoint and virtual object.

Sixth Embodiment

The above embodiments have been explained by assuming that the display device 1110 includes the right eye display screen and left eye display screen. However, the present invention is not limited to this, and it is also possible to share one display screen by the two eyes.

In addition, an apparatus including a display device and a measurement device capable of measuring its own position and orientation may also be used instead of the head mounted display. Furthermore, the display device and measurement device may be either integrated or separated.

It is also possible to use an apparatus including a display device and image sensing device instead of the head mounted display. The display device and image sensing device may be either integrated or separated.

Seventh Embodiment

In the above embodiments, when the operation mode of the image processing apparatus 1000 changes, the viewpoint also switches from the VR (MR) mode viewpoint to the application mode viewpoint or vice versa accordingly. However, it is also possible to preset whether to switch the viewpoints in accordance with the change in operation mode.

In addition, when setting a viewpoint, it is also possible to switch whether to use the position component, the orientation component, both the position and orientation components, or part of each component, of position and orientation components to be used.

Eighth Embodiment

It is also possible to switch images to be output to one display device such as a display device 1110 or display unit 1400. Furthermore, it is also possible to connect, for example, a device that displays an application mode image, a device that displays a VR (MR) mode image, and a device that selectively displays an application mode image and VR (MR) mode image, to the image processing apparatus 1000. In this case, an output image is transmitted to one of these devices in accordance with the output image. In addition, it is possible to use a display device that always presents an application mode image and VR (MR) mode image, but updates the position and orientation of the viewpoint in accordance with the present mode.

Ninth Embodiment

Figure 2:
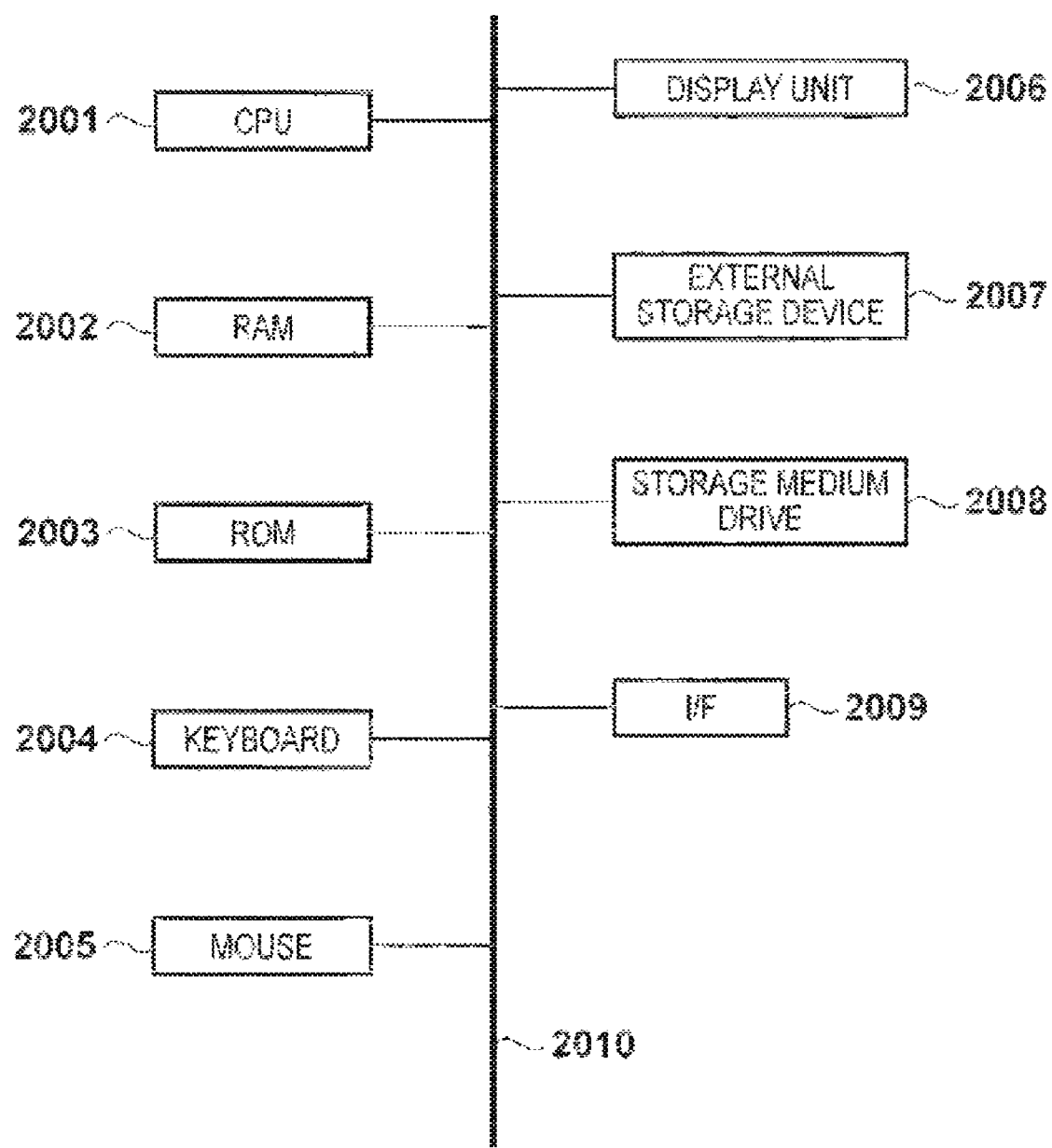
FIG. 2 is a block diagram showing a hardware configuration example of a computer.

The individual functional units forming the image processing apparatus 1000, 8000 shown in FIGS. 1 and 8 can be configured by hardware, and one or more of these functional units except for a data storage unit 1040 can also be configured by software (computer programs). In this case, a CPU of an apparatus including the data storage unit 1040 as a memory and including functional units implemented by hardware executes the software, so the apparatus functions as the image processing apparatus 1000 (8000). FIG. 2 shows a hardware configuration example of a computer including the functional units as software except for the data storage unit 1040, and including the data storage unit 1040 as a memory.

A CPU 2001 controls the operation of the whole computer by using computer programs and data stored in a RAM 2002 and ROM 2003, and executes each process described above as a process to be performed by the image processing apparatus 1000 (8000).

The RAM 2002 has an area for temporarily storing computer programs and data loaded from an external storage device 2007 and storage medium drive 2008. In addition, the RAM 2002 has an area for temporarily storing data (for example, a signal (data) received from the magnetic receiver 1120 and images from the image sensing devices 8011a and 8011b) received from an external apparatus via an I/F (interface) 2009. Furthermore, the RAM 2002 has a work area to be used by the CPU 2001 when executing various processes. That is, the RAM 2002 can provide various areas as needed. For example, the RAM 2002 can also function as the data storage unit 1040.

Setting data, a boot program, and the like of the computer are stored in the ROM 2003. A keyboard 2004 and mouse 2005 function as the above-mentioned input unit 1300. The operator of the computer can input various kinds of information (for example, a mode setting instruction and the position and orientation of the application mode viewpoint) to the CPU 2001 by operating the keyboard 2004 and mouse 2005.

A display unit 2006 is formed by a CRT or liquid crystal screen, and can display processing results from the CPU 2001 as images and characters. The display unit 2006 functions as, for example, the above-mentioned display unit 1400, and can display a virtual space image, a mixed reality space image, a message to be displayed to measure the position and orientation of the display device 1110 (8010), and the like.

The external storage device 2007 is a mass storage device such as a hard disk drive. An OS (Operating System) and computer programs and data to be used to cause the CPU 2001 to execute the above-described processes as processes to be performed by the image processing apparatus 1000 (8000) are saved in the external storage device 2007. The programs include a computer program for causing the CPU 2001 to execute the functions of the functional units, except for the data storage unit 1040, which form the image processing apparatus 1000 (8000). Also, the data contains data explained as being prestored in the data storage unit 1040 (for example, virtual space data and data explained as known information in the above explanation). The computer programs and data saved in the external storage device 2007 are loaded into the RAM 2002 as needed under the control of the CPU 2001. The CPU 2001 executes processing by using the loaded programs and data. As a consequence, this computer executes the above-described processes as processes to be performed by the image processing apparatus 1000 (8000). Note that the external storage device 2007 also functions as the data storage unit 1040.

The storage medium drive 2008 reads out computer programs and data recorded on a storage medium such as a CD-ROM or DVD-ROM, and writes computer programs and data in the storage medium. Note that a part or the whole of the computer programs and data explained above as being saved in the external storage device 2007 may also be recorded on this storage medium. The computer programs and data read out from the storage medium by the storage medium drive 2008 are output to the external storage device 2007 or RAM 2002.

The I/F 2009 is an interface for connecting external devices such as the display device 1110 (8010) and magnetic receiver 1120 to this computer. The I/F 2009 includes, for example, an analog port and a digital input/output port such as IEEE1394 for connecting the image sensing device 8011a (8011b) to this computer, and an Ethernet port for outputting an image to the display device 1110 (8010). Data received via the I/F 2009 is input to the RAM 2002 or external storage device 2007. All of the above-described units are connected to a bus 2010.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-132026, filed Jun. 24, 2013 which is hereby incorporated by reference herein in its entirety.

What is claimed is:

1. An image processing apparatus comprising
a memory for storing a program, and
at least one processor for executing the program stored in the memory to execute the steps of:
   acquiring a position of a head mounted display device;
   setting one of a first mode and a second mode as an operation mode of the image processing apparatus;
   generating an image of a virtual space containing a virtual object seen from a first viewpoint having a position and orientation set by a user and outputting the generated image to a display device other than the head mounted display device, while the first mode is set;
   registering the position of the head mounted display device, the position being acquired immediately after the operation mode of the image processing apparatus is switched from the first mode to the second mode;

determining a second viewpoint based on (i) the position of the head mounted display device that is acquired immediately after the switching and is registered, (ii) a position of the first view point immediately before the switching, and (iii) a current position of the head mounted display device that is acquired; and generating an image of a virtual space seen from the second viewpoint that is determined, and outputting the generated image of the virtual space to the head mounted display device, while the second mode is set.

2. The image processing apparatus according to claim 1, wherein the at least one processor is for executing the program stored in the memory to execute the further steps of:

acquiring an orientation of the head mounted display device, and while the second mode is set, determining the second viewpoint further based on the acquired orientation, and generating and outputting the image of the virtual space seen from the second viewpoint.

3. The image processing apparatus according to claim 1, wherein the at least one processor is for executing the program stored in the memory to execute the further steps of:

while the second mode is set, determining the second viewpoint based on a corrected orientation obtained by correcting the acquired orientation by using the orientation set by the user in the first mode and the orientation of the head mounted display device immediately after the switching.

4. The image processing apparatus according to claim 1, wherein the at least one processor is for executing the program stored in the memory to execute the further steps of:

acquiring an image of a physical space, wherein the image of the virtual space generated is composited with the image of the physical space to generate a composite image, and the image processing apparatus outputs the composite image.

5. The image processing apparatus according to claim 1, wherein the position of the second viewpoint is determined based on a difference between the current position of the head mounted display device and the registered position of the head mounted display device to the position of the first viewpoint immediately before the switching.

6. An image processing method to be performed by an image processing apparatus, the image processing method comprising:

setting one of a first mode and second mode as an operation mode of the image processing apparatus;

generating an image of a virtual space containing a virtual object seen from a first viewpoint having a position and orientation set by a user and outputting the generated image of the virtual space to a display device other than a head mounted display device, while the first mode is set as the operation mode of the image processing apparatus;

acquiring and registering a position of the head mounted display device immediately after the operation mode of the image processing apparatus is switched from the first mode to the second mode;

determining a second viewpoint based on (i) the position of the head mounted display device that is acquired immediately after the switching and is registered, (ii) a position of the first viewpoint immediately before the switching, and (iii) a current position of the head mounted display device; and generating an image of a virtual space seen from the determined second viewpoint, and outputting the generated image of the virtual space to the head mounted display device, while the second mode is set as the operation mode of the image processing apparatus.

7. A non-transitory computer-readable storage medium storing a computer program which causes a computer to execute the steps of:

acquiring a position of a head mounted display device;

setting one of a first mode and a second mode as an operation mode of the image processing apparatus;

generating an image of a virtual space containing a virtual object seen from a first viewpoint having a position and orientation set by a user and outputting the generated image to a display device other than the head mounted display device, while the first mode is set;

registering the position of the head mounted display device, the position being acquired immediately after the operation mode of the image processing apparatus is switched from the first mode to the second mode;

determining a second viewpoint based on (i) the position of the head mounted display device that is acquired immediately after the switching and is registered, (ii) a position of the first view point immediately before the switching, and (iii) a current position of the head mounted display device that is acquired; and generating an image of a virtual space seen from the second viewpoint that is determined, and outputting the generated image of the virtual space to the head mounted display device, while the second mode is set.

* * * * *